United States Patent [19]

Boström

[11] 3,884,016
[45] May 20, 1975

[54] APPARATUS FOR WRAPPING GOODS WITH STRETCHED FOIL
[75] Inventor: Sigward Boström, Jonkoping, Sweden
[73] Assignee: Arenco-JM AB, Jonkoping, Sweden
[22] Filed: Dec. 3, 1973
[21] Appl. No.: 420,843

[30] Foreign Application Priority Data
Dec. 14, 1972 Sweden............................ 16331/72

[52] U.S. Cl..................................... 53/182; 53/229
[51] Int. Cl............................................. B65b 11/16
[58] Field of Search ............. 53/30, 30 S, 182, 184, 53/228, 229, 230, 231, 232, 233

[56] References Cited
UNITED STATES PATENTS 3,158,973 12/1964 Monaghan ........................ 53/182 X
3,490,194 1/1970 Monaghan ........................ 53/182 X
3,504,476 4/1970 Ehrenfried ...................... 53/30 S X
3,564,810 2/1971 Faletti............................... 53/182 X
3,589,100 6/1971 Konars.............................. 53/229 X
3,590,549 7/1971 Zelnick............................. 53/30 X
3,643,396 2/1972 Togashi............................ 53/229 X
3,672,116 6/1972 Ingmarson ....................... 53/229 X Primary Examiner—Travis S. McGehee
Assistant Examiner—John Sipos
Attorney, Agent, or Firm—Pierce, Scheffler & Parker

[57] ABSTRACT

In an apparatus for wrapping an object with foil, a wrapping of the foil is maintained in stretched condition about four sides of the object whilst the foil wrapping is welded closed and severed from the web of foil.

1 Claim, 4 Drawing Figures

APPARATUS FOR WRAPPING GOODS WITH STRETCHED FOIL

This invention relates to an apparatus for wrapping and fixing one or more pieces of goods with or without a support by enclosing the goods on at least four sides with a foil whilst stretching the foil.

A known apparatus for wrapping goods in this way comprises foil rolls disposed on each side of a conveying web for the goods, which rolls are interconnected by a coherent foil portion, and further means acting together with each foil roll for braking the foil when the goods is being advanced between the foil rolls to a position, in which three sides of the goods are enclosed by the foil. The apparatus further comprises two opposed clamping and welding jaws capable to move against each other to cause the two foil portions separated by the goods to join and be welded together on the fourth side of the goods, which jaws have a width corresponding to the foil width. The apparatus also comprises a knife member for cutting off the foil portions longitudinally through the weld or between two welds.

It is essential that the foil portion between the foil rolls is held taught ahead of the goods when the goods meets the foil for stretching it, particularly when small pieces of goods are to be wrapped which pass through a shorter distance at the stretching of the goods. When the clamping and welding jaws are being moved against each other for clamping the two foil portions and carrying out the welding operation, the jaws cause foil to be reeled off from the respective foil roll. When then after completed welding the jaws return to their starting position to the side of the goods near the foil rolls, a slackness develops in the foil portion between the foil rolls. It is this slackness which the invention is intended to eliminate. The object of the invention, thus, is to tighten the foil at least across the conveying web for the goods and along a width corresponding at least to the width of the goods. For achieving this object, the invention shows the characterizing features defined in the claims.

The invention is described in the following by way of an embodiment, with reference to the accompanying drawings, in which FIG. 1 shows a perspective view of a known apparatus of the kind, to which the invention refers.

Figure 1:
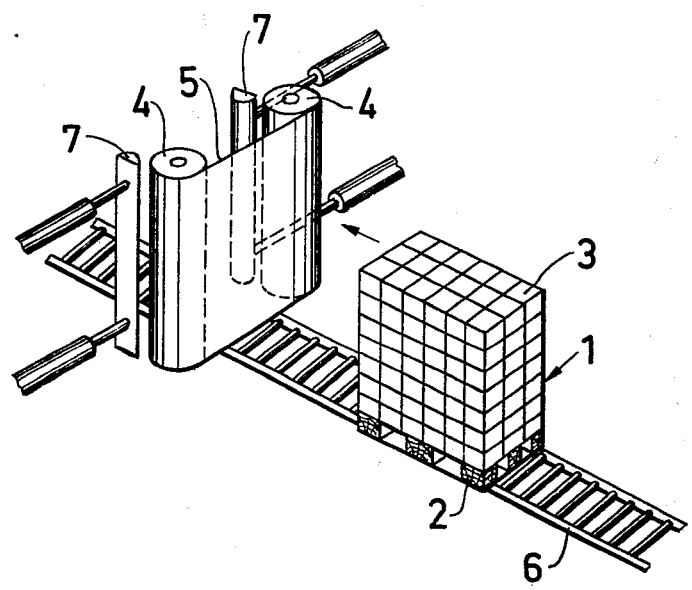
Figure 2:
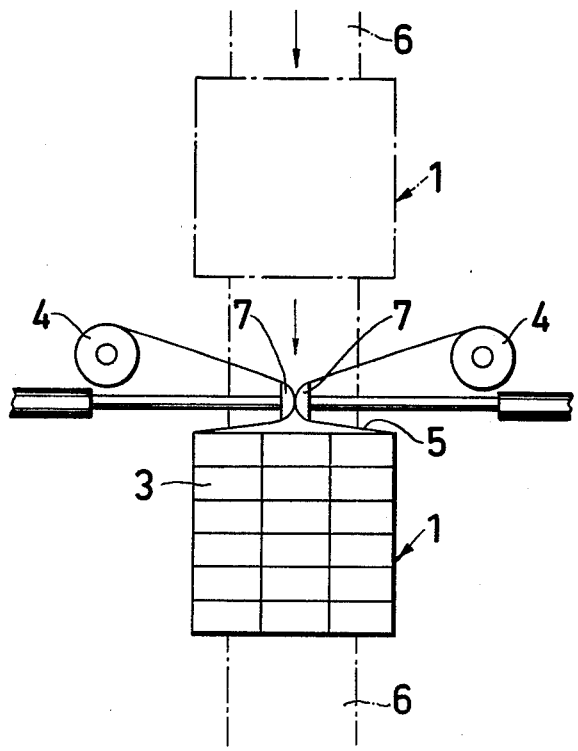
FIG. 2 shows a view from above on the apparatus according to FIG. 1.

The apparatus as known comprises a conveying web 6 for advancing the goods 1, which is to be wrapped or packed in a foil 5. The goods may be small goods parcels 3 disposed on a pallet 2. The goods stack 1 is advanced on the conveying web 6 towards the tightened foil 5, which is reeled off from two foil supply rolls 4. Upon arrival of the goods at the foil 5, the foil is forcefully tightened about the goods whilst the supply rolls 4 are being braked. This braking may also be effected in a way other than at the supply rolls 4. The foil 5 is stretched forcefully about the goods in a known manner, and the two foil portions separated by the goods are caused to join each other and be welded together on the fourth side of the goods by means of the two clamping and welding jaws 7.

Figure 3:
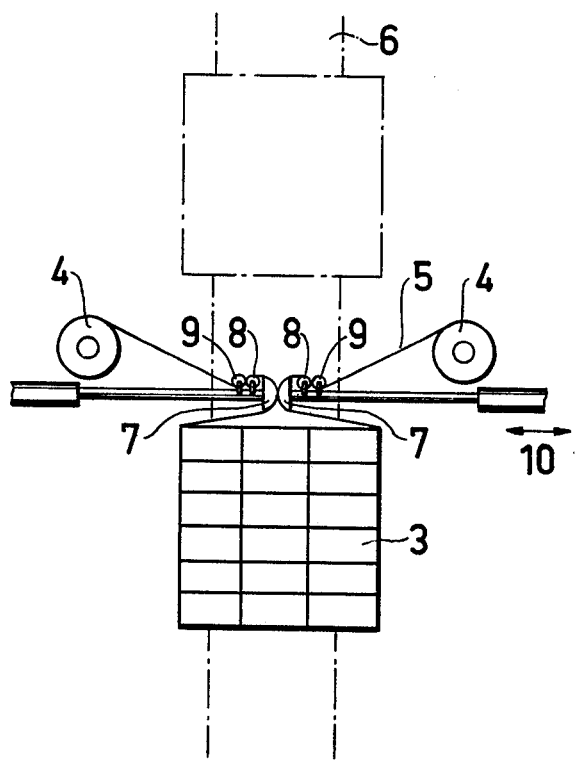
FIG. 3 illustrates in a schematic manner the invention seen from above in the position, in which the clamping and welding jaws are moved against each other.
Figure 4:
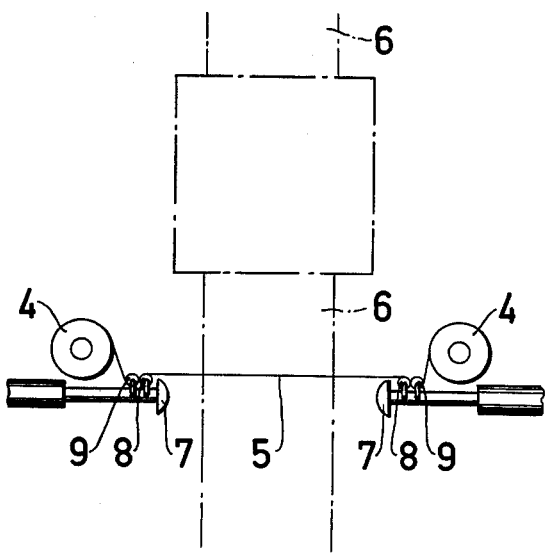
FIG. 4 shows in a view from above a subsequent step in the position for the clamping and welding jaws.

Subsequent to the welding, the jaws 7 return to their original position, see FIG. 1, and the foil portion between the supply rolls 4 is released. As the foil is not tightened between the rolls 4 when it is being reeled off from the rolls, a slackness develops between said supply rolls 4. This slackness is of disadvantage in view of the next goods to arrive at the foil and be wrapped thereby. According to the idea of the present invention, therefore, the arrangement was made as shown schematically in FIGS. 3 and 4. In connection to the clamping and welding jaws 7, two brake rollers 8 and 9 are provided whereof at least one has a surface with good friction against the foil, and the other roller, for example 9, presses the foil against said first roller. The foil runs zigzag about the rollers, inwards to the centre of the conveying web 6 and past the clamping and welding jaw 7 located most adjacent said two rollers. The brake rollers 8 and 9 participate in the reciprocatory movement of the associated jaw according to the arrow 10. The roller 9 may be supported for free rotation while the roller 8 is braked and preferably braked adjustably. Therefore, when the jaws 7, and thereby the rollers 8 and 9, return to the original position after completed welding of the foil, the foil is stretched between the brake rollers 8 and 9 on one side and on the other side of the conveying web 6. The foil thereby is tightened across the conveying web when the next goods is advanced for being wrapped by the foil. The brake rollers also brake the foil discharge and thereby bring about a suitable stretching of the foil about the goods. The starting position for the jaws and brake rollers is shown in FIG. 4.

At the embodiment illustrated in a schematic manner, the brake rollers 8 and 9 are coupled together with the jaws 7 and participate in the reciprocatory movement of the jaws. At alternative embodiments, the jaws 7 may, for being moved along a rectilinear reciprocatory path, instead perform an oscillatory movement inwards to the centre of the conveying web and, thus, be supported on pivotal arms. The brake rollers 8 and 9 may be supported on separate pivotal arms, which are coupled together with the pivotal arms for the jaws 7. The brake rollers 8 and 9, further, may be arranged so as to perform their movement separately or disconnected from the jaws 7, but the movement must be timed in such a way, that after the welding operation the brake rolls perform a return movement, so that the foil is tightened across the conveying web 6. Several variations of the invention, thus, are possible within the scope of the following claims.

What I claim is:

1. An apparatus for wrapping and fixing of at least one unit of goods with or without support, the unit being enclosed on at least four sides by a foil whilst the foil is being stretched, said apparatus comprising
    two foil rolls disposed one on each side of a conveying web for the unit, which foil rolls are interconnected by a coherent foil portion;
    means acting together with each foil roll for braking the foil when the unit of goods is being advanced between the foil rolls to a position in which three sides of the unit are enclosed by the foil;
    two opposed clamping and welding jaws capable of being moved toward each other on the fourth side of the unit of goods for joining and welding together the two foil portions separated by the unit, which jaws have a width corresponding to the foil width;

a knife member for cutting off the foil portions longitudinally through the weld or between two welds;

two pairs of brake rollers for the foil, one pair on each side of the conveying web of the unit of goods, each pair of brake rollers comprising a rotary rubber roller which is adjustably braked, said each pair of rollers being supported by the clamping and welding jaws for performing a reciprocatory movement in correspondence with the movement of the clamping and welding jaws, at least one roller of each pair being braked, and the foil being supported between said two brake rollers of each pair.

* * * * *